United States Patent [19]

Appelt

[11] 4,257,099
[45] Mar. 17, 1981

[54] COMMUNICATION BUS COUPLER

[75] Inventor: Daren R. Appelt, Austin, Tex.

[73] Assignee: Texas Instruments Incorporated, Dallas, Tex.

[21] Appl. No.: 919,644

[22] Filed: Jun. 27, 1978

Related U.S. Application Data

[63] Continuation of Ser. No. 622,318, Oct. 14, 1975.

[51] Int. Cl.³ .................... G06F 9/46; G06F 15/16
[52] U.S. Cl. ........................................... 364/200
[58] Field of Search ... 364/200 MS File, 900 MS File

[56] References Cited

U.S. PATENT DOCUMENTS

| | | | |
|---|---|---|---|
| 3,445,822 | 5/1969 | Driscoll | 364/200 |
| 3,638,195 | 1/1972 | Brender et al. | 364/200 |
| 3,820,079 | 6/1974 | Bergh et al. | 364/200 |
| 3,882,455 | 5/1975 | Heck et al. | 364/200 X |
| 3,886,524 | 5/1975 | Appelt | 364/200 |
| 3,932,841 | 1/1976 | Deerfield et al. | 364/200 |
| 4,016,541 | 4/1977 | Delagi et al. | 364/200 |
| 4,047,162 | 9/1977 | Dorey et al. | 364/900 |
| 4,050,058 | 9/1977 | Garlic | 364/200 |
| 4,050,096 | 9/1977 | Bennett et al. | 364/200 |
| 4,130,865 | 12/1978 | Heart | 364/200 |

Primary Examiner—Mark E. Nusbaum
Attorney, Agent, or Firm—Thomas G. Devine; Leo N. Heiting; Melvin S. Sharp

[57] ABSTRACT

A coupler pair provides the communication link between two multiprocessors wherein each multiprocessor comprises a plurality of master and slave devices interconnected by a communication bus. The coupler pair provides a communication path between any master device on one of the communication buses and any slave device on the opposite communication bus. More generally a plurality of coupler pairs provides intercommunication within a polysystem comprised of a plurality of multiprocessors.

5 Claims, 9 Drawing Figures

COMMUNICATION BUS COUPLER

This is a continuation of Ser. No. 622,318, filed Oct. 14, 1975.

This invention relates to a method and system for communication between multiprocessors. More specifically, the invention relates to communication between two or more communication buses, each of which in turn provides the communication link between master and slave devices comprising a multiprocessor.

In operation of general purpose digital computers it is often required that a number of master devices be able to communicate to a number of slave devices over a common bus system. An asynchronous communication bus is disclosed in U.S. Pat. No. 3,886,524 to Appelt, and assigned to the assignee of the present invention. That communication bus comprises 16 parallel data lines, 20 parallel address lines, and 11 additional control lines. The bus provides a particularly convenient and efficient means of communication between the master and slave devices a general purpose digital computing system. For the purpose of this disclosure, such a plurality of master and slave devices along with the interconnecting communication bus will be referred to as a multiprocessor. As additional master and slave devices are added to the multiprocessor, a point is reached wherein the channel capacity of the communication bus is exceeded. Beyond this point the communication bus becomes the limiting element of the multiprocessor.

The computational capability of the system may be increased by providing a second multiprocessor comprised of a plurality of master and slave devices interconnected by a second communication bus. In such a combination it is sometimes desired that master devices located on one of the communication buses be capable of communication with slave devices connected to the other communication bus. More generally it is desired that master devices located on any of a plurality of communication buses be capable of communication with slave devices located on one or more of the other communication buses. Such a combination of multiprocessors, when provided with the desired inter-bus communication links, will be referred to as a polysystem.

It is therefore an object of the invention to provide a method and system for communication between a master device and a slave device wherein the master and slave devices are each coupled to a different communication bus.

It is a further object of the invention to provide communication between any master device and any slave device of a system comprising a plurality of multiprocessors.

It is another object of the invention to provide a communication path between two communication buses, wherein the communication path automatically resolves the impass when master devices coupled to the two communication buses simultaneously request access to the communication path.

While no limitation is to be implied thereby, the invention will be disclosed in connection with the asynchronous communication bus disclosed in the aforementioned U.S. Pat. No. 3,886,524. A better understanding of the present invention may be facilitated by reference to that patent. A polysystem may be considered to be comprised of two multiprocessors, each of the multiprocessors comprising a plurality of master and slave devices coupled by a communication bus. In accordance with the preferred embodiment, each of the communication buses has associated with it a coupler device. Each coupler device is in communication with the various data, address, and control lines of the communication bus. The two coupler devices communicate with each other through a coupler bus, also comprised of data, address, and control lines. As will be understood in greater detail subsequently, each coupler device partakes partially of the aspects of a slave device and partially of the aspects of a master device. If, for example, a master device located along communication bus A wishes to transfer data to a slave device located along communication bus B, the master device places the data, address, and a go signal on communication bus A. Each slave device located along communication bus A is responsive to the go signal and compares the address with its own unique complement of addresses. Coupler A, functioning as a slave device, is similarly responsive to the go signal and recognizes that the address falls within its own complement of addresses. Accordingly, coupler A transmits the data, address, and appropriate control signals along the coupler bus to coupler B. Coupler B in turn, functioning as a master device, places the data, address, a go signal, and a read signal on communication bus B. The appropriate slave device located on communication bus B in response to the go and read signals, reads the data on communication bus B. It will be seen, therefore, that the invention provides a unique and efficient communication link between devices located along two or more communication buses.

Other objects and features of the invention may be best understood by reference to the following detailed description when read in conjunction with the accompanying drawings, wherein.

Figure 1A:
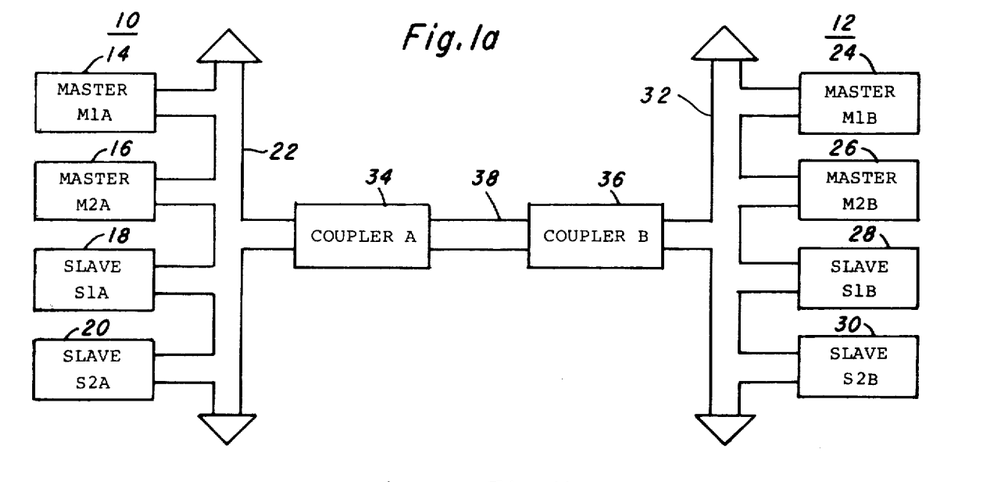
FIGS. 1a and 1b conceptually illustrate the invention.

With reference to FIG. 1a, there is shown in block diagram form one embodiment of the invention. Illustrated at 10 and 12 are two multiprocessors. Multiprocessor 10 is comprised of master devices 14 and 16, slave devices 18 and 20, and a communication bus 22. Similarly, multiprocessor 12 is comprised of master devices 24 and 26, slave devices 28 and 30, and communication bus 32. While each of multiprocessors 10 and 12 are illustrated as having two master devices and two slave devices, each multiprocessor may have a greater or lesser number of master and slave devices. Also connected ot the communication bus 22 and associated therewith is a coupler 34. Similarly, connected to communication bus 32 and associated therewith is a coupler 36. Finally, couplers 34 and 36 are mutually connected by coupler bus 38 which is comprised of a plurality of data lines, address lines, and control lines. It will be seen that master/slave communication such as between master device 16 and slave device 28 is by means of communication bus 22, coupler 34, coupler bus 38, coupler 36, and communication bus 32. While FIG. 1a depicts an embodiment of the invention, the invention is illustrated in its greater generality by the diagram of FIG. 1b.

Figure 1B:
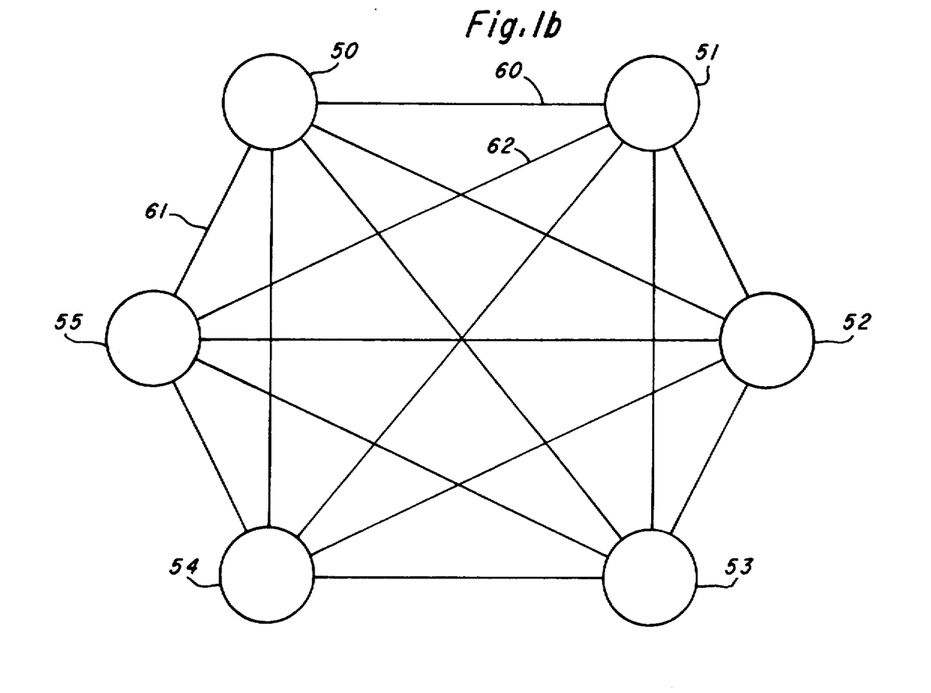

In FIG. 1b each of circles 50 through 55 represents a multiprocessor such as multiprocessors 10 and 12 of FIG. 1a. Each of the lines in FIG. 1b such as lines 60, 61 and 62 represents a coupler link such as that comprised of couplers 34 and 36 and coupler bus 38 of FIG. 1a. FIG. 1b is a polysystem comprised of a plurality of multiprocessors wherein each multiprocessor is coupled to every other multiprocessor by a direct coupler link. It is not always necessary or desirable, however, that a direct coupler link be provided between each pair of multiprocessors. It might be desirable, for example, to dispense with coupler link 60. Even without coupler link 60, however multiprocessors 50 and 51 may still communicate with each other through coupler link 61 the communication bus of multiprocessor 55, and coupler link 62. The coupler links which will now be described in greater detail provide an efficient and highly flexible means of coupling together the various multiprocessors of a polysystem.

Figure 2:
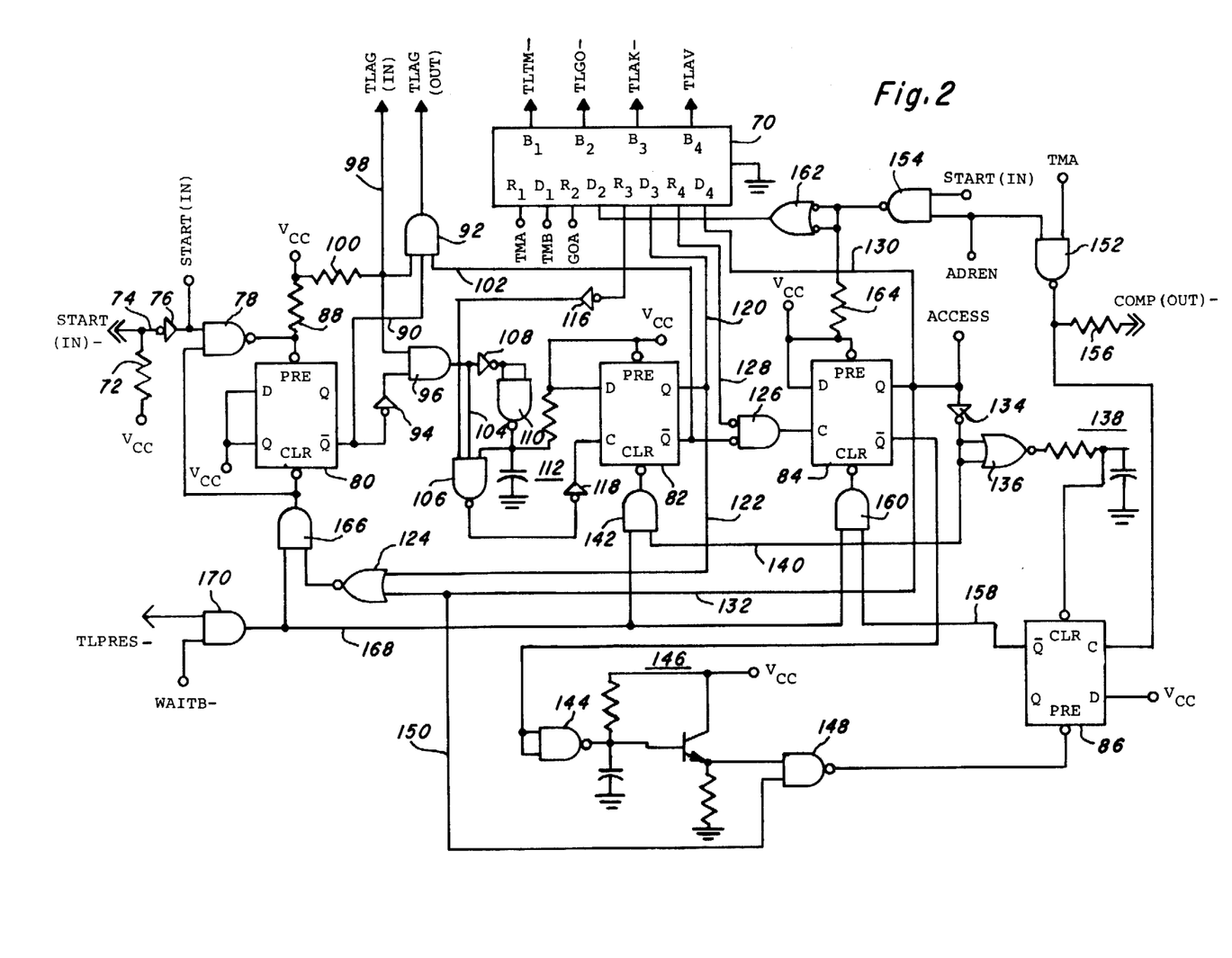
FIG. 2 is a schematic diagram showing the access control logic of a coupler.

FIG. 2 is a schematic diagram of a portion of a coupler such as coupler 34 of FIG. 1a. In the schematic diagram of FIGS. 2-6 two different types of external terminals are shown: (1) those terminals leading to the communication bus with which the coupler is associated and designated by a single arrowhead, and (2) those leading to the coupler bus and designated by a double arrowhead. In referring to signals herein, a complement will be signified by a mnemonic followed by a bar $(-)$. The signals on those terminals leading to the communications bus are defined in U.S. Pat. No. 3,886,524. It will be appreciated from the following detailed description, however, that the coupler relates to these signals sometimes in the manner of a slave device and sometimes in the manner of a master device.

Turning next to those terminals leading to the coupler bus, a first such terminal START(IN)—is connected by a line in the coupler bus to a START(OUT)—terminal in the associated coupler. The START(IN)—terminal, which is referenced through resistor 72 to a positive voltage supply $V_{cc}$, is connected by line 74 and an inverter 76 to one input of NAND gate 78. The output of NAND gate 78 drives the preset input of flip flop 80, this preset input also being connected by resistor 88 to $V_{cc}$. Flip flops 80, 82, 84 and 86 may each be a model Ser. No. 74H74 integrated circuit. This and all other integrated circuits referred to herein are available from Texas Instruments Incorporated of Dallas, Texas. The C and D inputs of flip flop 80 are both referenced to $V_{cc}$. The $\overline{Q}$ output of flip flop 80 is coupled by line 90 to one input of AND gate 92 and by inverter 94 to one input of AND gate 96. A second input of AND gate 92 and of AND gate 96 is connected by line 98 to external terminal TLAG(IN) and by resistor 100 to $V_{cc}$. The third input of AND gate 92 is connected by line 102 to the $\overline{Q}$ output of flip flop 82. The output of AND gate 96 is coupled through line 104 to one input of NAND gate 106 and through inverter 108, NAND gate 110, and RC time delay network 112 to a second input of NAND gate 106. The D and preset terminals of flip flop 82 are coupled to $V_{cc}$. The third input to NAND gate 106 is provided through inverter 116 from the $R_3$ terminal of receiver/driver unit 70.

Receiver/driver unit 70 may be a model SN75138 integrated circuit. Unit 70 actually comprises four independent receiver/ driver units, these being designated in FIG. 2 by the subscripts 1-4. Thus, a first such independent unit designated by the subscript 1 includes a receiver terminal $R_1$ whose logic level is at all times the opposite of that at bus terminal $B_1$ and driver terminal $D_1$ which controls the bus terminal $B_1$ when the enable (E) terminal is in a low logic state. This control is in the sense that the $B_1$ terminal will be in the low state whenever the $D_1$ terminal is in the high state, whereas low level signals at the $D_1$ terminal will have no effect on the logic level at the $B_1$ terminal.

The output signal of NAND gate 106 is coupled through inverter 118 to the C input of flip flop 82. The Q output of flip flop 82 is coupled by line 120 to the $D_3$ input of unit 70 and by line 122 to one input of NOR gate 124. The $\overline{Q}$ output of flip flop 82 provides one input to NOR gate 126 the output of which is connected to the C input of flip flop 84. The second input to NOR gate 126 is connected to the $R_4$ terminal of unit 70 by line 128. The preset and D terminals of flip flop 84 are referenced to $V_{cc}$. The $\overline{Q}$ output of flip flop 84 is coupled by line 130 to the $D_4$ terminal of unit 70, by line 132 to the second input of NOR gate 124, and by inverter 134 to both inputs of NOR gate 136. The output of NOR gate 136 drives the clear input of flip flop 86 through an RC time constant network 138. The output of inverter 134 is also coupled by line 140 to one input of AND gate 142. The $\overline{Q}$ output of flip flop 84 is coupled by NAND gate 144 through an RC time constant network 146 to one input of NAND gate 148. The Q output of flip flop 84 through line 150 provides the second input to NAND gate 148 the output of which controls the preset terminal of flip flop 86. The D input of flip flop 86 is coupled to $V_{cc}$.

The TMA signal appearing on terminal $R_1$ of unit 70 provides a first input to NAND gate 152. The second input of NAND gate 152 as well as a first input of NAND gate 154 is provided by an ADREN signal which is available at the output of inverter 350 in FIG. 5a. The output of NAND gate 152 is connected to the C input of flip flop 86, and by resistor 156 to a COMP-(OUT)-terminal of the coupler bus. This terminal is connected by a line in the coupler bus to the COMP-(IN)- terminal in the associated coupler. The $\overline{Q}$ output of flip flop 86 is connected by line 158 to a first input of AND gate 160. The second input to NAND gate 154 is a START (IN) signal, available at the output of inverter 76. The output of NAND gate 154 provides both inputs to NAND gate 162, these inputs also being referenced through resistor 164 to $V_{cc}$. The output of NAND gate 162 is connected to the $D_2$ terminal of unit 70.

The output of NOR gate 124 provides a first input to AND gate 166. The second input to each of AND gates 142, 160 and 166 is provided on line 168 by the output of AND gate 170. One input of AND gate 170 is the signal TLPRES- appearing on one of the lines of the communication bus. The second input to AND gate 170 is the signal WAITB- which appears at the $\overline{Q}$ output of flip flop 262 in FIG. 4. The outputs of AND gates 166, 142 and 160 drive the clear inputs of flip flops 80, 82 and 84, respectively. The output of AND gate 166 also provides a second input to NAND gate 78.

Figure 3:
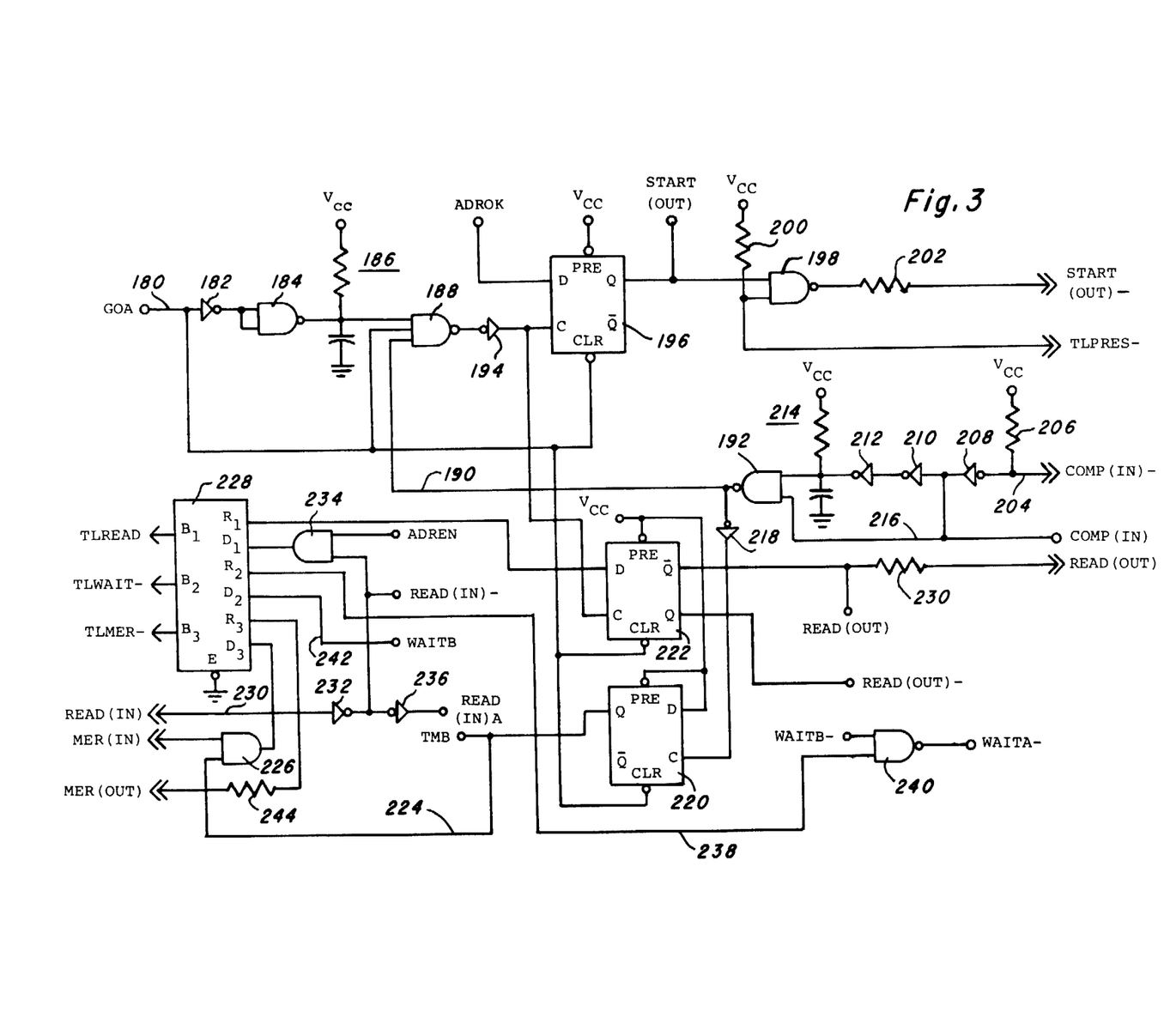
FIG. 3 is a schematic diagram showing other control logic circuits of a coupler.

FIG. 3 is a schematic diagram of a further portion of the coupler. One of the input signals to this portion of the circuit is the GOA signal appearing on line 180 and obtained from the $R_2$ terminal of unit 70 in FIG. 2. The GOA signal is coupled through inverter 182 to both inputs of NAND gate 184 and thence through RC time constant network 186 to one input of NAND gate 188. A second input to NAND gate 188 is the GOA signal appearing on line 80, and the third input is obtained on line 190 from the output of NAND gate 192. The output of NAND gate 188 is coupled through inverter 194 to the C input of flip flop 196. The D input of flip flop 196 is the ADROK signal available at the output of NOR gate 340 in FIG. 5a. The clear input of flip flop 196 is the GOA signal appearing on line 180 while the preset input is obtained from $V_{cc}$.

The Q output of flip flop 196 provides one input to NAND gate 198, the second input of which is provided by the signal TLPRES- available from the communication bus. The second input to flip flop 198 is referenced to $V_{cc}$ through resistor 200 at those times when the signal TLPRES- is high. The output of NAND gate 198 is coupled through line matching resistor 202 to a coupler bus output START(OUT)-. This line in the coupler bus is attached to a START(IN)- input of the associated coupler.

A second input to the structure of FIG. 3 is the COMP(IN)- signal from the coupler bus. This signal is provided by the associated coupler at its COMP(OUT)- terminal. The COMP(IN)- signal appearing on line 204 is referenced through resistor 206 to $V_{cc}$ and provides an input to inverter 208. The output of inverter 208, after passing through inverters 210 and 212 is coupled through an RC time constant network 214 to one input of NAND gate 192. The output of inverter 208 also provides the second input to NAND gate 192 on line 216. The output of NAND gate 192 is coupled by inverter 218 to the C input of flip flop 220. The preset inputs of flip flops 220 and 222 as well as the D input of flip flop 220 are all referenced to $V_{cc}$. The clear inputs of flip flops 220 and 222 are provided by the GOA signal appearing on line 180. The Q output of flip flop 220 is connected by line 224 to one input of AND gate 226 The D input of flop 222 is provided by the $R_1$ output of receiver/ driver unit 228 which may also be a model SN75138 integrated circuit. The corresponding bus terminal $B_1$ of unitt 228 is connected to the TLREAD signal in the communication bus. The C input of flip flop 222 is available from the output of inverter 194. The Q output of flip flop 222 is available as a READ(OUT)- signal to other portions of the coupler circuit. The $\overline{Q}$ output of flip flop 222 is available to other portions of the coupler circuit as a READ(OUT) signal and is also coupled by line matching resistor 230 to the READ(OUT) line of the coupler bus. This line is coupled at its other end to a READ(IN) terminal of the associated coupler.

The READ(IN) signal appearing on line 230 is provided by a line in the coupler bus which is connected at its other end to the READ(OUT) terminal of the associated coupler. This signal appearing on line 230 is connected through inverter 232 to one input of AND gate 234. The second input to AND gate 234 is provided by the ADREN signal available at the output of inverter 350 in FIG. 5a. The output of AND gate 234 is connected to the $D_1$ terminal of unit 228. The output of inverter 232 is also connected to inverter 236 whose output comprises a READ(IN)A signal for use elsewhere in the circuit. Another input from the communication bus is the TLWAIT- signal which is connected to the $B_2$ bus terminal of unit 228. The corresponding receiver terminal $R_2$ is coupled by line 238 to one input of NAND gate 240. The other input of NAND gate 240 is the WAITB- signal provided at the Q output of flip flop 262 in FIG. 4. The output of NAND gate 240 is a WAITA- signal for use elsewhere in the circuit. The $D_2$ driver terminal of unit 228 is coupled by line 242 to the WAITB signal at the $\overline{Q}$ output of flip flop 262 in FIG. 4. A second input to AND gate 226 is the MER-(IN) signal provided by a line in the coupler bus. This line is connected at the other end of the coupler bus to the MER(OUT) terminal of the associated coupler. The output of AND gate 226 is connected to the $D_3$ driver terminal of unit 228. The $R_3$ receiver terminal of unit 228 is connected through line matching resistor 224 to the MER(OUT) terminal which is connected by a line in the coupler bus to the MER(IN) terminal of the associated coupler. In unit 228 the associated bus terminal $B_3$ is connected to the TLMER- line of the communication bus. Flip flops 196, 222, and 220 may each be a model Ser. No. 74H74 integrated circuit.

Figure 4:
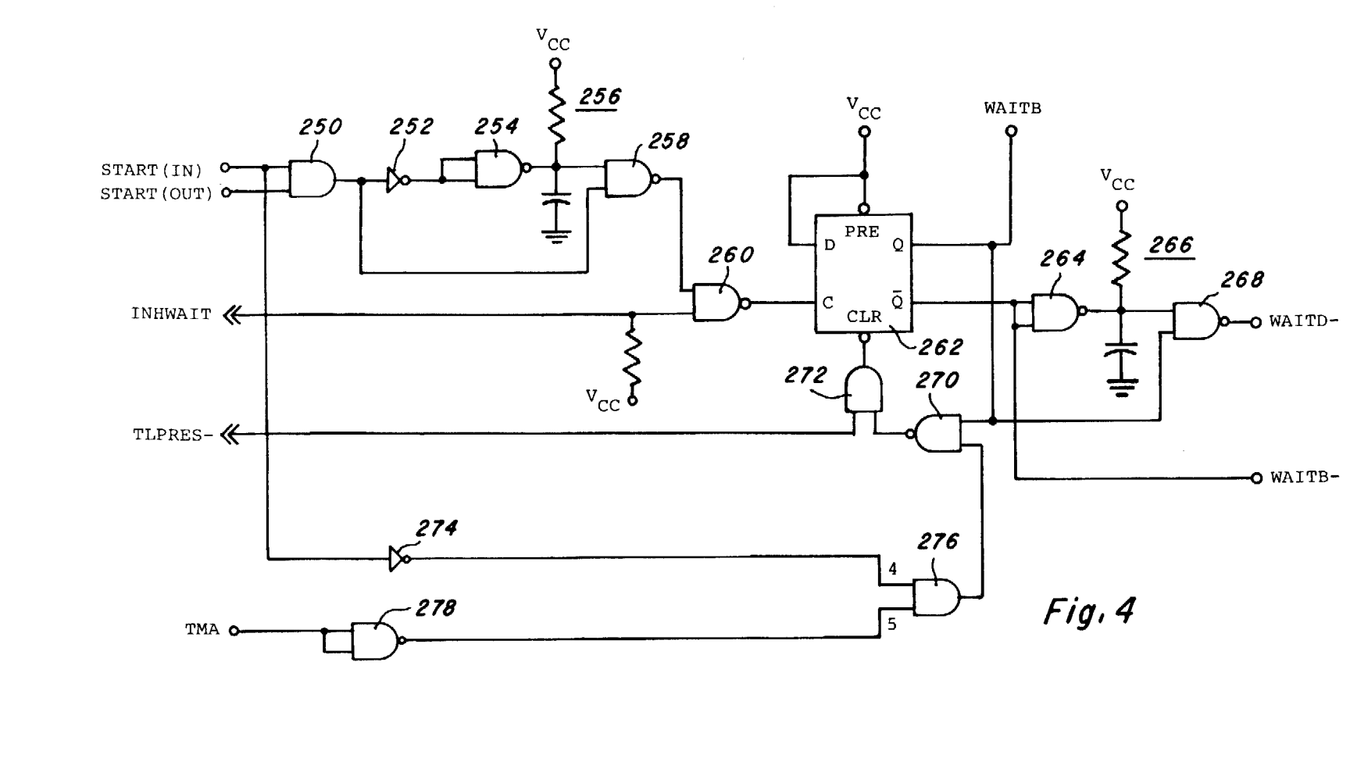
FIG. 4 is a schematic diagram of coupler impass resolving logic.

FIG. 4 is a schematic diagram of that portion of the coupler logic which generates signals to resolve the impass that would otherwise occur if master devices on two coupled buses simultaneously seek to access a slave device of the opposite bus. The START(IN) signal is available at the output of inverter 76 in FIG. 2 while the START(OUT) signal is available at the Q output of flip flop 196 of FIG. 3. These two signals provide the inputs to AND gate 250 whose output is coupled through inverter 252, NAND gate 254, and RC time constant circuit 256 to one input of NAND gate 258. The output of AND gate 250 also provides the other input to NAND gate 258 whose output provides one input to NAND gate 260. The second input to NAND gate 260 is an INHWAIT signal provided at the connection to the coupler bus. There is no line in the coupler bus for carrying the INHWAIT signal. Rather, at one of the couplers the INHWAIT terminal is grounded while at the other of a pair of couplers this termnal is left floating. It will be seen therefore, that the second input of NAND gate 260 will be at ground potential for that coupler whose corresponding input terminal is grounded and will be at a high potential $V_{cc}$ for that coupler whose INHWAIT input is left floating. The output of NAND gate 260 provides the clock input of flip flop 262 (which may also be a model Ser. No. 74H74 integrated circuit). The preset and D inputs of flip flop 262 are coupled to $V_{cc}$. The $\overline{Q}$ output of flip flop 262 is available as a WAITB- signal and provides both inputs to NAND gate 264. The output of NAND gate 264 is coupled through RC time constant circuit 266 to one input of NAND gate 268. The Q output of flip flop 262 provides a WAITB signal as well as the other input to NAND gate 268. The output of NAND gate 268 is available as a WAITD- signal for use in other parts of the circuit. The Q output of flip flop 262 also provides a first input to NAND gate 270. The output of NAND gate 270 provides one input to AND gate 272 the output of which drives the clear input of flip flop 262. The second input to AND gate 272 is the TLPRES- signal provided by the communication bus. The START(IN) signal is also coupled through inverter 274 to one input of AND gate 276. The TMA signal which is available at the $R_1$ terminal of unit 70 in FIG. 2 is coupled through NAND gate 278 to the other input of AND gate 276. The output of AND gate 276 drives the second input of NAND gate 270.

Figure 5A:
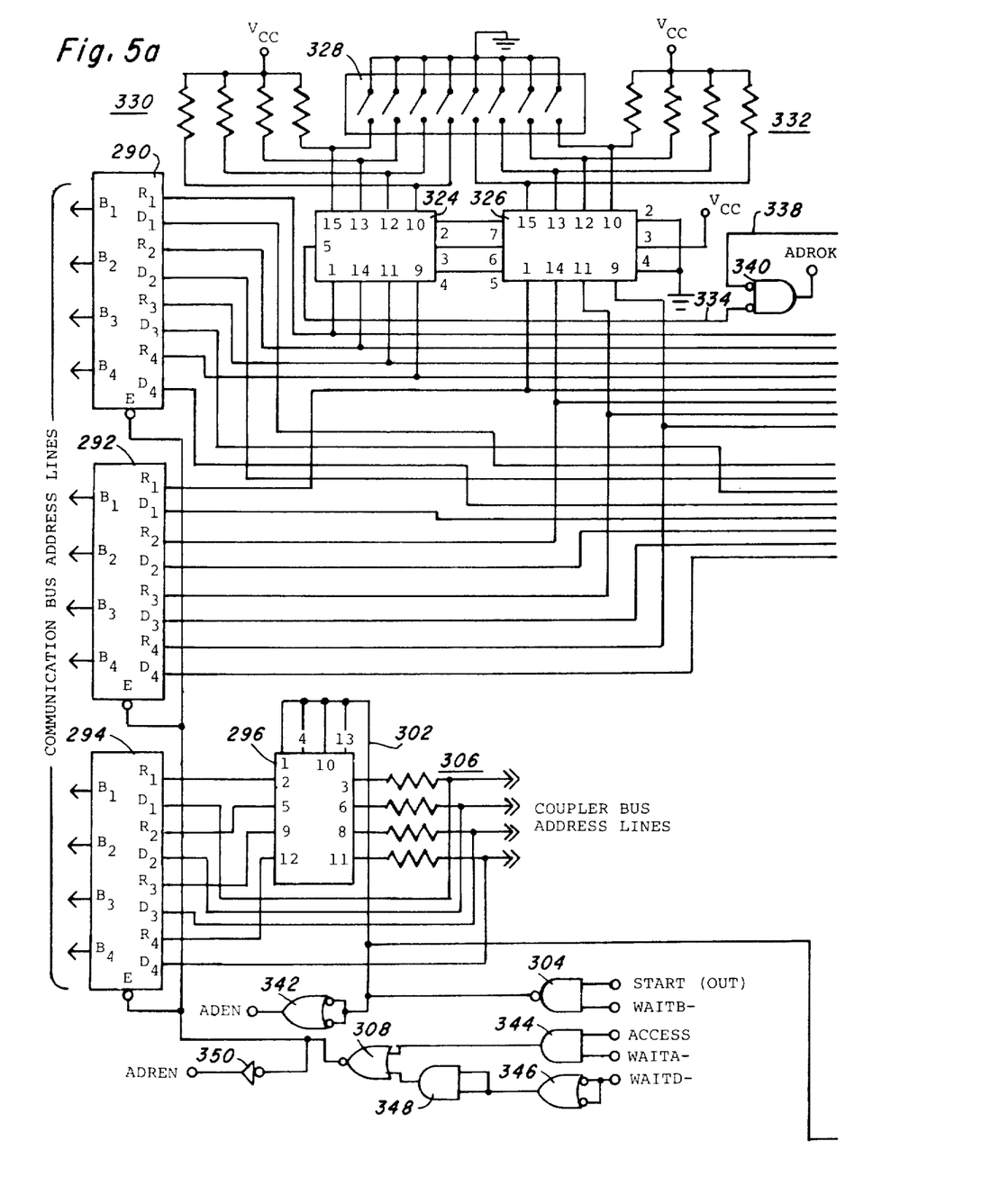
FIGS. 5a and 5b show the address transfer circuits.
Figure 5B:
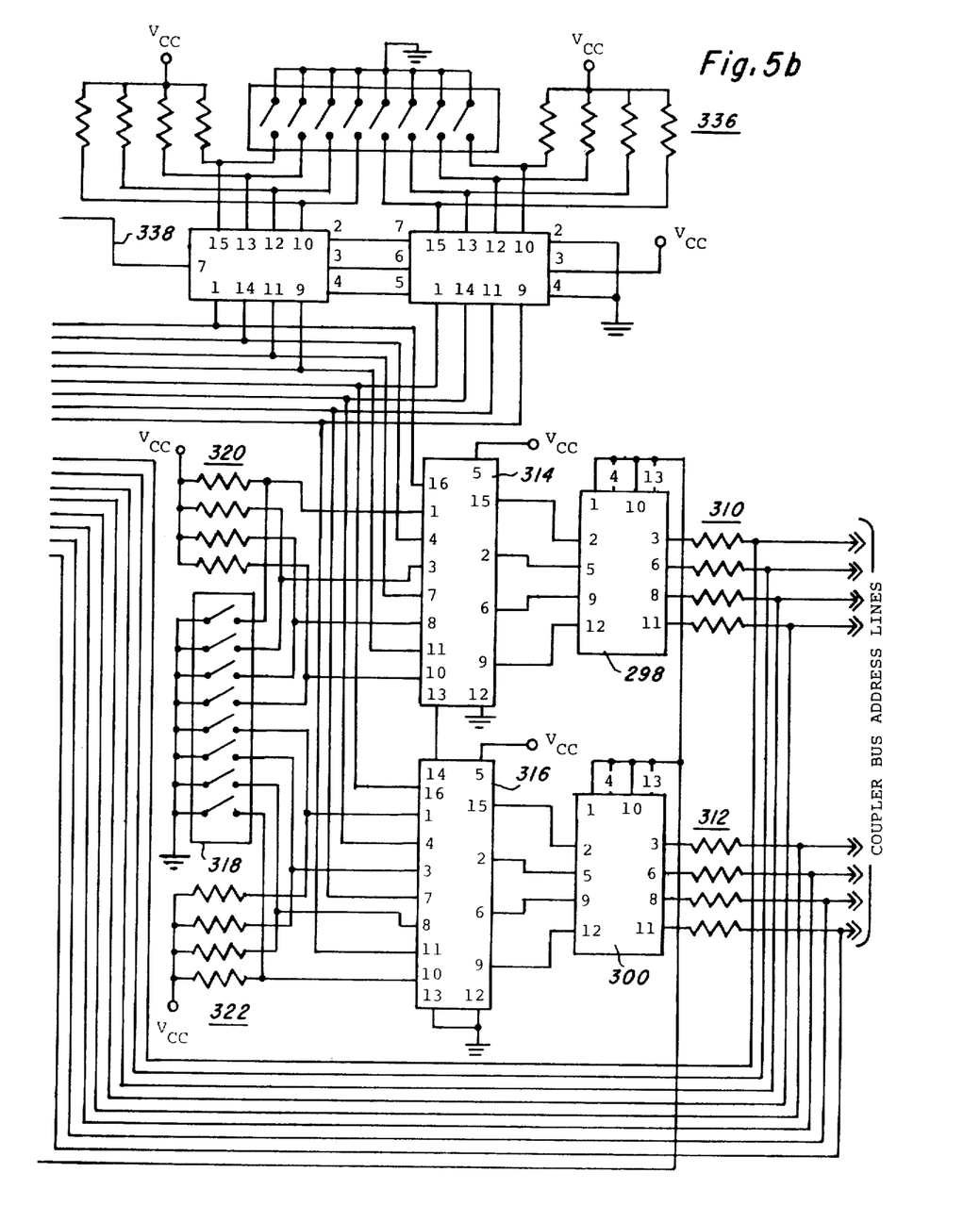

FIGS. 5a and 5b taken in conjunction show schematically that portion of the coupler which controls the flow of address signals through the coupler and between its communication bus and its coupler bus. The right margin of FIG. 5a should be located adjacent the left margin of FIG. 5b to illustrate the flow of signals between the two figures. As seen in FIG. 5a, the address lines of the communication bus are coupled to the bus terminals of receiver/driver units 290, 292 and 294.

In the preferred embodiment of the invention the communication bus will carry a 20 bit address and the coupler will include 5 receiver/driver units such as unit 290. In the interest of clarity, two of the receiver/driver units have not been shown explicitly in FIG. 5a. In the preferred embodiment the four most significant bits of the address are coupled to the bus terminals of unit 290, the next four most significant bits are coupled to the bus terminals of unit 292 and the next four most significant bits are coupled to the bus terminals of unit 294. It will be understood, therefore, that the eight least significant bits of the address will be coupled to the receiver/driver units which are not shown. Unit 294 along with its associated circuits will serve to define the manner of connection of the missing receiver/driver units. Each of the receiver/driver units of FIG. 5a may be a model Ser. No. 75138 integrated circuit.

Considering first the four least significant address bits shown in FIG. 5a, that is, the bits coupled to the bus terminals of unit 294, when the enable input of unit 294 is in the high state, the drive terminals are disengaged from the first bus terminals. In this case the address bits coupled to the bus terminals by the communication bus also appear at the corresponding read terminals of unit 294. The four read terminals of unit 294 are connected to the four input terminals 2,5,9, and 12 of gate 296. Gate 296 as well as gates 298 and 300 of FIG. 5b may each be a model SN74125 integrated circuit. Each such integrated circuit actually comprises four independent gates each having an input, an output, and a control terminal. In the case of gate 296 the four control terminals 1, 4, 10 and 13 are commonly connected by line 302 to the output of NAND gate 304. When the output of NAND gate 304 is in the low state, the four input terminals 2, 5, 9 and 12 are electrically connected to the output terminals 3, 6, 8 and 11, respectively. The four address bits are then coupled by line matching resistors 306 to the appropriate four address lines in the coupler bus. Thus, it will be seen that when the enable input of unit 294 is in the high state and the control input on line 302 to gate 296 is in the low state the address bits appearing on the communication bus are transmitted to the corresponding address lines of the coupler bus.

Alternatively, when the line 302 control input to gate 296 is in the high state, the outputs of gate 296 are isolated from the inputs and the structure of FIG. 5a exercises no control over the signal appearing on the coupler bus address lines. If in this case the enable input of unit 294 is in the low state, then the respective driver terminals of unit 294 will control the corresponding bus terminals. In this case the four address bits appearing on the four address lines of the coupler bus will be coupled through unit 294 to the corresponding address lines of the communication bus. The eight least significant bits of the address (those not shown explicitly in FIGS 5a and 5b) are processed by a structure identical to that just described.

The above description is substantially representative of the processing of the eight most significant address bits also, but with a slight modification. It will be noted, for example, that the enable inputs of all the receiver/driver units are controlled by the same signal, that is, the output of NOR gate 308. Thus, at any given time either all of the bus terminals of these units will be in communication with the corresponding receive terminals of the units, or conversely all of the bus terminals will be under control of the corresponding driver terminals. Similarly, the output of NAND gate 304 provides the control input to gates 298 and 300 as well as gate 296. Thus, when the enable input to the receiver/driver units is high and the output of NAND gate 304 is low, then the eight most significant address bits will be transmitted through the receiver/driver units and will be coupled through gates 298 and 300 via matching resistor banks 310 and 312 to the eight most significant address bit lines in the coupler bus. Again, conversely when the output of NAND gate 304 is high and the receiver/driver unit enable signal is low, then the eight most significant address bits appearing on the coupler bus will be communicated through units 290 and 292 to the eight most significant bit lines of the communication bus. It will be seen, therefore, that the structure of FIGS. 5a and 5b provides for bidirectional transfer of address data between the communication bus and the coupler bus. In the case of transfer from the communication bus to the coupler bus, however, there is provided structure for modifying the eight most significant address bits as will next be described.

The reason for providing structure to modify the eight most significant address bits appearing on a communication bus may be understood with reference to FIG. 1a. Assume that master device 14 on communication bus 22 is seeking to communicate with slave device 28 on communication bus 32 and that slave device 28 is a memory unit. For reasons well known to those skilled in the computer art, it is frequently desirable for memory units such as slave device 28 to have the lowest available locations. Thus, slave device 28, for example, may be assigned address locations 0 through 4095. It is probable, however, that one of the slave devices coupled to communication bus 22 will also be a memory unit and have address locations 0 through 4095. Thus, if master device 14 seeks to communicate with slave device 28 by transmitting an address falling within the address block 0 to 4095, master device 14 will succeed instead in communicating with a slave device located on its own communication bus 22. To resolve this difficulty the address locations of all slave devices connected to communication bus 32 are incremented by 4096 before storing these address locations in the master devices coupled to communication bus 22. Therefore, master device 14 when seeking to communicate with slave device 28 will transmit an address falling in the block 4096 through 8191. Coupler A then decrements the address transmitted by master device 14 by a factor of 4096 before passing the address on to coupler bus 38. The decremented address then falls within the block of addresses assigned to slave device 28, that is, 0 through 40 through 4095. This selective decrementing is accomplished by the circuit illustrated in FIG. 5b.

The eight most significant address bits received from the communication bus through the receiver terminals of units 290 and 292 are coupled through adder circuits 314 and 316 to gates 298 and 300. Units 314 and 316 may each be a model Ser. No. 7483 integrated circuit. When coupled in cascade as shown in FIG. 5b they comprise an eight bit binary full adder. An eight bit binary number to be used for decrementing the eight most significant address bits is generated by the combination of switch bank 318 and resistor banks 320 and 322. The proper decrement value is established by selective closure of individual switches within switch bank 318. This eight bit decrement signal is then combined with the eight most significant address bits in units 314 and 316 so as to provide a decremented address to gates 298 and 300. It will be noted that decrementing does not occur when the address is to be coupled from the coupler bus to the communication bus.

Also illustrated in FIGS. 5a and 5b is a circuit which ensures that the coupler will transmit data from the communication bus to the coupler bus only if the address appearing on the communication bus falls within a preselected range of addresses. With reference to FIG. 5a, units 324 and 326 each comprise a model Ser. NO. 7485 integrated circuit. When coupled in cascade as shown these two four bit magnitude comparators combine to form an eight bit magnitude comparator. The eight most significant address bits received by the receiver terminals of units 290 and 292 provide one of the eight bit inputs to this eight bit comparator. A second eight bit binary number representing the lowest acceptable bound for these eight most significant address bits is generated by the combination of switch bank 328 and resistor banks 330 and 332. The eight bit comparator compares these two eight bit binary numbers and provides a terminal 5 output to line 334 which is in the low logic state only when the eight most significant address bits are greater than or equal to the preselected lower bound. Similarly, the virtually identical logic circuit shown generally at 336 of FIG. 5b compares the eight most significant address bits with a preselected upper bound. In this case, however, the output to line 338 is taken from terminal 7 of one of the four bit comparators and will be in the low logic state only when the eight most significant address bits are less than the preselected upper bound. As a result, the output of NOR gate 340, that is signal ADROK, is high only when the eight most significant bits of the address appearing on the communication bus fall within the preselected bounds. The signal ADROK is used elsewhere in the coupler to inhibit transmission of data to the coupler bus when the address on the communicatin bus does not meet the aforementioned criteria.

One input to NAND gate 304 is the START(OUT) signal appearing at the Q terminal of flip flop 196 in FIG. 3. The second input to NAND gate 304 is the WAITB- signal provided by the $\overline{Q}$ output of flip flop 262 in FIG. 4. Normally the WAITB-signal will be high so that a high level START(OUT) signal will result in a low level drive input to gates 296, 298 and 300 so that the coupler bus address lines will be driven. This low level output of NAND gate 304 is coupled through NAND gate 342 to provide a logic signal ADEN indicative of the fact that the coupler bus address lines are being driven.

A first input to AND gate 344 is the ACCESS signal provided by the Q output of flip flop 84 in FIG. 2. The second input of AND gate 344 is the WAITA- signal provided by NAND gate 240 of FIG. 3. Since the WAITA- signal is normally high, a high level ACCESS signal will provide a high level to one input of NOR gate 308. Both inputs of NAND gate 346 are provided by the WAITD- signal which appears at the output of NAND gate 268 in FIG. 4. In the normal situation where the WAITD- signal is high, the low output of NAND gate 346 is coupled through AND gate 348 to the second input of NOR gate 308. Thus, when the ACCESS signal is in the high state the output of NOR gate 308 will be low and units 290, 292 and 294 will be enabled to transmit the coupler bus address bits to the communication bus. Alternatively, when the ACCESS signal is in the low state the output of NOR gate 308 will be high thereby inhibiting transmission of address bits from the coupler bus to the communication bus. The output of NOR gate 308 is coupled through inverter 350 to provide an ADREN logic signal which, when high, indicates that address bits are being passed from the coupler bus to the communication bus.

Figure 6:
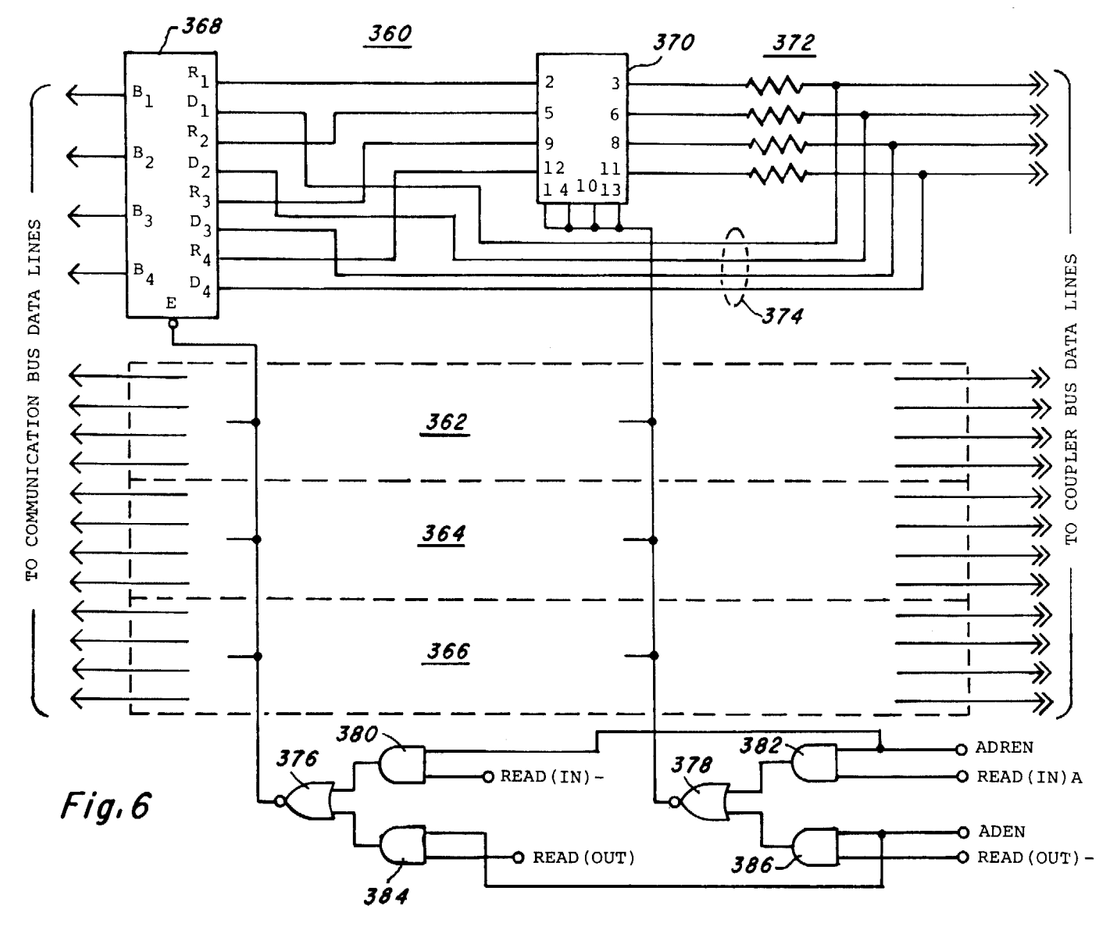
FIG. 6 shows the data transfer circuits.

The remaining structure, shown in FIG. 6, is that portion of the coupler which provides the bidirectional transfer of the data bits themselves between the communication bus and the coupler bus. As used herein and in the appended claims, the terms "data", "data bits", and "data words" will be intended to represent either numerical data or instructions. In the preferred embodiment each data word is comprised of 16 bits. In FIG. 6 there is shown generally at 360 the circuit necessary to provide this bidirectional transfer of four bits of the data word. Identical circuits will be provided at each of dashed rectangles 362, 364 and 366 to accomplish the transfer of the remaining twelve bits of each data word. With reference to circuit 360, four of the data lines in the communication bus are coupled to the four bus terminals of receiver/driver units 368. Unit 368 is a model Ser. No. 75138 integrated circuit and functions in the manner previously described. The receiver terminals of unit 368 are coupled to terminals 2, 5, 9, and 12 of gate 370 which is a model Ser. No. 74125 integrated circuit. Output terminals 3, 6, 8, and 11 of gate 370 are coupled through line matching resistors 372 to four of the data lines in the coupler bus. These four coupler bus data lines are also coupled by means of lines 374 back to the driver terminals of unit 368. Circuit 360 functions in the manner previously described in connection with FIG. 5a to bidirectionally couple four bits of data between the communication bus and the coupler bus. This operation is under the control of the outputs of NOR gates 376 and 378. Nor gates 376 and 378 in turn are controlled by the outputs of AND gates 380, 382, 384 and 386. It will be noted that the ADREN signal appearing at the output of inverter 350 in FIG. 5a provides one input to each of AND gates 382 and 380. Similarly, the ADEN signal appearing at the output of NAND gate 342 in FIG. 5a provides one input to each of AND gates 384 and 386. As will be appreciated in greater detail subsequently, when the coupler is functioning as a slave device under the control of a master device on its bus the ADEN signal will be high and the ADREN signal will be low. Under these circumstances the outputs of both AND gates 380 and 382 will be low but both of AND gates 384 and 386 will have one of their inputs high. The READ(OUT) input to AND GATE 384 and the READ(OUT)- input to AND gate 386 are provided by the $\overline{Q}$ and Q outputs respectively of flip flop 222 in FIG. 3. As will be explained subsequently, when the master device is seeking to write through the coupler into a slave device on another bus the READ(OUT) signal will be low while the READ-(OUT)- signal will be high. Accordingly, the output of AND gate 384 remains low, the output of NOR gate 376 remains high, and unit 368 remains disabled so that its receiver terminals couple the data bits from the communication bus to gate 370. AND gate 386, however, has a high output thereby causing the output of NOR gate 378 to go low and enable gate 370 to pass these data bits on to the corresponding four data lines in the coupler bus and ultimately to a remote slave device. If conversely the controlling master device is seeking to read from a remote slave device then the READ(OUT) signal will be high and the READ(OUT)- signal will be low. In this case unit 368 will be enabled while gate 370 will be disabled and data bits from the coupler bus will be transferred to the communication bus from which they can be read by the controlling master device.

In the case where the coupler is functioning as a master device under control of its associated coupler the ADREN signal will be high while the ADEN signal will be low. In this case the alternative enabling of unit 368 and gate 370 is under the control of AND gates 380 and 382 and utlimately their respective input signals READ(IN)- and READ(IN)A. In FIG. 3, these two signals are seen to be complement of each other and function to properly directionally control the flow of data bits through the coupler.

The overall operation of the coupler may be understood with the help of a specific example. Let it be assumed, therefore, that master device 14 of FIG. 1a seeks to write a data word into slave device 28. In this case coupler 34 will function in a slave mode with respect to master 14 while coupler 36 will function in a master mode with respect to slave device 28. To initiate the transfer master device 14 will cause the TLGO- line of bus 22 to go low thereby resulting in a high level GOA signal at terminal $R_2$ of unit 70 in FIG. 2. The high level GOA signal on line 180 of FIG. 3 causes one input of NAND gate 188 to go high immediately and a second input to go high after the time delay caused by the time constant network 186. This time delay which is of the order of 100 nanoseconds is provided to insure that the circuits of FIGS. 5a and 5b have had sufficient time to provide a proper ADROK signal prior to clocking flip flop 196. When master device 14 pulls the TLGO-line low it also couples the data it wishes to write and the address in slave device 28 at which it wishes to write on the communication bus. All slave units coupled to communication bus 22 will recognize the low level TLGO-signal but only that slave device whose complement of addresses contains the address transmitted by master device 14 will respond. The address complement of slave device 28 will, of course, be included within the address complement of slave coupler 34 (taking into consideration the address decrementing performed in the circuits of FIGS. 5a and 5b) so that a high level ADROK signal will appear at the output of NOR gate 340. Since the signal appearing on line 190 at this point in the operational cycle is normally high, it follows that when the output of NAND gate 184 goes high the output of NAND gate 188 will go low resulting in a positive going transition at the clock input of flip flop 196. With the high level ADROK signal this will result in the Q output of flip flop 196 switching to a high logic level. Since the TLPRES- signal is normally high, this will cause the output of NAND gate 198 to go low, thereby providing a low level START-(OUT)- signal on the coupler bus leading to master coupler 36.

At the same time that master device 14 pulls the TLGO-line low it will pull the TLREAD line of bus 22 low thereby indicating that it wishes to write in a remote slave device. This low level at terminal $B_1$ of unit 228 (FIG. 3) results in a high logic level at the corresponding receiver terminal $R_1$ and the D input of flip flop 222. Flip flop 222 is clocked at the same time as flip flop 196 by the output of inverter 194 and its $\overline{Q}$ output goes low thereby providing a low level logic signal at the READ(OUT) terminal of the coupler. At the same time the Q output of flip flop 222 goes high. Turning now to FIG. 5a, the START(OUT) signal derived from the Q output of flip flop 196 (FIG. 3) is high and it will be recalled that the WAITB- is normally high. As a result, the output of NAND gate 304 is low thereby enabling gates 296, 298 and 300 to transfer the addresses from bus 22 to the coupler bus. The logic signal ADEN will be high. Since the WAITD- signal is in its normally high state and the access signal low, both inputs to NOR gate 308 will be low and its high output will disable the drivers of units 290, 292 and 294. The ADREN signal has a low logic level.

Next, with reference to FIG. 6, since the ADREN signal is low neither of AND gates 380 or 382 can have a high output state. The ADEN signal, however, is high and the READ(OUT)- signal was seen above to be in the high state. AND gate 386 will have a high output thereby resulting in a low output from NOR gate 378. This low output enables gate 370 so that the data bits appearing on bus 22 are transferred to the coupler bus. Since the READ(OUT) signal is low the output of NOR gate 376 remains high thereby disabling the driver terminal of unit 368. To summarize the operation up to this point, slave coupler 34 has coupled both the address bits and the data bits from bus 22 to the coupler bus 38. Further, slave coupler 34 has provided a low level START(OUT)- signal and a low level READ(OUT) signal on the coupler bus.

Turning next to the operation of master coupler 36 it will be recalled that the last mentioned two signals or the coupler bus are received at the master coupler 36 as a START(IN)- and READ(IN) signal respectively. Now, considering FIGS. 2-6 to represent the structure of master coupler 36 and with particular reference to FIG. 2, the low level START(IN)- signal, after inversion in inverter 76 provides a high level to one input of NAND gate 78. Since the other input of NAND gate 78 is in its normally high state the resultant low level at the output of NAND gate 78 presets flip flop 80 causing its $\overline{Q}$ output to go low. This low logic level at the input to AND gate 92 results in a low level TLAG(OUT) signal on bus 32. This signal signifies to all master devices on bus 32 that are junior to coupler 36 that coupler 36 is seeking access to bus 32. Additionally the low level signal after inversion in inverter 94 causes the output of AND gate 96 to go high, assuming that no master device on bus 32 that is senior to coupler 36 is attempting to gain access as would be signified by a low level TLAG(IN) signal on line 98. Further, if the TLAK- signal is high thereby indicating that no master device on bus 32 is in an acknowledge state, then the $R_3$ terminal of unit 70 will be low and inverter 116 will provide a second high level input to NAND gate 106. Finally, the high level at the output of AND gate 96, after a time delay determined by the RC time constant of RC network 112 will cause the output of NAND gate 110 to go high. These three high levels at the input to NAND gate 106 result in a positive going transition at the clock input of flip flop 82. Since the D input of flip flop 82 is referenced to a positive supply voltage, this causes its Q output to go high and its $\overline{Q}$ output to go low. The high Q output which is coupled to terminal $D_3$ of unit 70 results in a low level TLAK- signal on terminal $B_3$ thereby indicating to all other master devices on bus 32 that coupler 36 is in the acknowledge state. This high level Q ouput also causes the output of NOR gate 124 to go low thereby resulting in a low level at the output of AND gate 166 to clear flip flop 80 in preparation for the next cycle of operation. The low level $\overline{Q}$ output of flip flop 82, however, causes the output of AND gate 92 to remain low and indicate to all junior master devices on the bus 32 that coupler 36 is seeking access to the bus. If no master device on bus 32 has access to the bus, then the signal TLAV will be high and the logic level at the terminal R4 of unit 70 will be low. Thus, when the $\overline{Q}$ output of flip flop 82 goes low this results in a positive going transition at the C input of flip flop 84 so that its Q output switches high and its $\overline{Q}$ output switches low. This high level Q output is coupled to terminal D4 of unit 70 and results in a low level TLAV signal on bus 32, thereby indicating to all other master units that coupler 36 has acquired access. The high level Q output is also coupled to a second input of NOR gate 124 to insure that flip flop 80 is held in the clear state as long as flip flop 84 remains in the access state. Additionally, when the Q output of flip flop 84 is high the output of inverter 134 is low resulting in a low clear input to flip flop 82 from the output of AND gate 142. This clears flip flop 82 causing its Q output to go low and its $\overline{Q}$ output to go high. The output of inverter 134 is also used to free the clear input of flip flop 86, this flip flop being used ultimately to clear flip flop 84 at the end of the access state. Normally, the output of inverter 134 is high so that the output of NOR gate 136 is low thereby holding flip flop 86 in the clear state. As such its $\overline{Q}$ output is high, which when combined with the high logic level on line 168 causes the output of AND gate 160 to be high so that the clear input of flip flop 84 is normally free allowing the flip flop to be clocked by its clock input. When the output of inverter 134 goes low, however, this results in a positive going transition at the output of NOR gate 136 which is transmitted to the clear input of flip flop 86 after a time delay imposed by RC network 138. This does not result in any transition in the output states of flip flop 86 but frees the flip flop so that its state may be changed by positive going transitions at the clock input.

The $\overline{Q}$ output of flip flop 84 provides an input to the network comprised of NAND gates 144 and 148 and RC time constant network 146. The network is utilized to terminate the access state approximately 10 microseconds after it is initiated in those cases where due to a malfunction, the access state does not terminate in its normal period of approximately one microsecond. Thus, the low level $\overline{Q}$ output from flip flop 84 in the access state is inverted by NAND gate 144 to a high level which is transmitted to one input of NAND gate 148 after an approximately 10 microsecond delay imposed by time constant network 146. The signal appearing on line 150 which stems from the Q output of flip flop 84 is also high so that the output of NAND gate 148 goes low. This low input to the preset input of flip flop 86 causes its $\overline{Q}$ output to go low. This low input to AND gate 160 results in a low output from AND gate 160 thereby clearing flip flop 84 from the access state. The normal mode of clearing flip flop 84 will be appreciated from the following discussion.

With continued reference to the operation of master coupler 36, when the START(IN)- low level signal is received from slave coupler 34, the START(IN) input to NAND gate 154 goes high. Now, with reference to FIG. 5a, it will be recalled that the ACCESS signal which provides one input to AND gate 344 is high when access is achieved by master coupler 36. Since the WAITA- signal is normally high the resulting high level at the output of AND gate 344 results in a low level logic signal at the output of NOR gate 308. This enables the drivers of units 290, 292 and 294 to couple the address bits from coupler bus 38 to communication bus 32. At the same time the ADREN signal at the output of inverter 350 goes high. This high level ADREN signal in the data transfer network of FIG. 6 enables one input of AND gates 380 and 382. It will be recalled from the preceding discussion that, since in the example presently under consideration, master unit 14 is attempting to write a data word into slave device 28, the READ(OUT) signal from slave coupler 34 is in the low logic state. This signal received by master coupler 36 at its READ(IN) terminal after passing through inverters 232 and 236 (FIG. 3) results in a low level READ(IN)A signal. As a result the output of AND gate 382 remains low so that the output of NOR gate 378 is high and gate 370 is disabled. The low level READ(IN) signal, however, is inverted by inverter 232 resulting in a high level READ(IN)- signal. Thus, the output of AND gate 380 is high causing the output of NOR gate 376 to go low thereby enabling the drivers of unit 368 to transfer the data bits from coupler bus 38 to communication bus 32.

Now returning to FIG. 2 and continuing with reference to the operation of master coupler 36, the high level ADREN signal taken with the previously noted high level START(IN) signal results in a low output from NAND gate 154 and a high level output from NAND gate 162. This high level signal at the D2 input of unit 70 results in a low level TLGO-signal appearing on communication bus 32. This low level TLGO-signal will initiate response by all the slave devices coupled to communication bus 32 but only slave device 28 will complete the response since it alone contains the address placed on communication bus 32 by master coupler 36.

Now with reference to FIG. 3, the high level READ(IN)-signal in master coupler 36 taken with the high level ADREN signal results in a high level output from AND gate 234 so that the TLREAD signal appearing on communication bus 32 will be low. This signifies to slave device 28 that slave device 28 is to read the data word appearing on bus 32.

Now with reference to FIG. 2 and continuing with the operation of the master coupler 36, when slave device 28 completes the data transfer, it returns a low level TLTM- signal on communication bus 32. This results in a high level TMA signal at the R1 terminal of unit 70. This high level TMA signal causes a low level at the output of NAND gate 152, this low level being placed on coupler bus 38 as a COMP(OUT)- signal. Note that this low level which is also connected to the clock input of flip flop 86 has no effect on the output states of the flip flop.

Next, turning to FIG. 3 and now with reference to the operation of slave coupler 34, the low level COMP(OUT)- signal transmitted by master coupler 36 is received as a low level COMP(IN)- signal at slave coupler 34. This is inverted to a high level signal by inverter 208 which signal on line 16 provides one input to NAND gate 192. After a time delay imposed by RC network 214, the other input of NAND gate 192 also goes high resulting in a low level output signal from the NAND gate and a high level transition at the clock input of flip flop 220. This causes the Q output of flip flop 220 to go high, resulting in a high level TMB signal. Turning now to FIG. 2 and continuing with reference to the operation of slave coupler 34, this high level TMB signal is coupled through unit 70 to provide a low level TLTM- signal on communication bus 22. This tells master device 14 that coupler 34, operating as a slave device, has completed its data transfer. As a result, master device 14 releases the TLGO- signal to a high state. This results in a low level GOA signal at the output of unit 70. This low level GOA signal clears each of flip flops 196, 222 and 220 (FIG. 3) and the consequent low level Q output from flip flip 196 results in a high level START(OUT- signal on coupler bus 38. Clearing flip flop 220 causes the TMB signal to go low thereby allowing the TLTM- signal on bus 22 to return to the high state.

The high level START(OUT)- signal is received by master coupler 36 as a high level START(IN)- signal which is converted by inverter 76 of FIG. 2 to a low level START(IN) signal. This low level signal at the input of NAND gate 154 results ultimately in a low level at the $D_2$ terminal of unit 70 and a high level TLGO- signal on communication bus 32. Slave device 28 when freed by this high level TLGO- signal releases the TLTM- signal on communication bus 32 to the high state. This is received by master coupler 36 as a low level TMA signal at the $R_1$ terminal of unit 70. This low level TMA signal at the input of NAND gate 152 results in a high level signal at the output of this NAND gate. This high level transition coupled to the clock input of flip flop 86 causes the $\overline{Q}$ output of this flip flop to go low, thereby clearing access flip flop 84 through AND gate 160. When the Q output of flip flop 84 goes low, the TLAV signal on communication bus 32 goes high, thereby indicating to all other master devices on the bus that master coupler 36 has released access to the bus. At the same time, the high level signal at the output of NAND gate 152 is placed on coupler bus 38 as a high level COMP(OUT)- signal.

Again considering FIG. 3, this high level signal is received as a COMP(IN)- signal by slave coupler 34. This results ultimately in a low level clock input to flip flop 220 and completes a data transfer cycle leaving both couplers 34 and 36 in an idle state awaiting the next call from a master device.

The operation when master device 14 seeks to read from slave device 28 is similar to that just described. In this case, however, master device 14 will place a high level TLREAD signal on communication bus 22. As will be seen by consideration of FIG. 3, this results in a high level READ(OUT) signal for use in the logic of slave coupler 34 and also transmitted on coupler bus 38 to master coupler 36. Again in the manner previously described, the ADEN signal of slave coupler 34 will be high, while the ADREN signal in coupler 34 will be low. The address bits are again coupled from communication bus 22 to coupler bus 38 by slave coupler 34. In this case, however, the high level ADEN signal taken in conjunction with the high level READ(OUT) signal in slave coupler 34 in FIG. 6 will permit the data bits to be transferred only from coupler bus 38 to communication bus 22. Turning next to FIG. 3 and with reference to the operation of master coupler 36, the high level READ(IN) signal results in a high level READ(IN)A signal and a low level READ(IN)- signal. As a result, the output of AND gate 234 is low and master coupler 36 transmits a high level TLREAD signal on communication bus 32, thereby indicating to slave device 28 that master device 14 wishes to read from it. Again as before, the ADEN signal of master coupler 36 will be low while its ADREN signal is high and units 290, 929 and 924 are again enabled to communicate the address from coupler bus 38 to communication bus 32. Turning to FIG. 6, however, the high level ADREN signal coupled with the high level READ(IN)A and low level READ(IN)- signals enable gate 370 to transfer data bits from communication bus 32 to coupler bus 38. Thus, in this case it is seen that the couplers work in conjunction to again pass the address bits from master device 14 to slave device 28, but in this case, data bits are passed from slave device 28 to master device 14.

In the case where master device 14 is seeking to read from slave device 28, if a read error occurs in slave device 28 the slave device will pull the TLMER- line of communication bus 32 low. This low level TLMER- signal received at unit 228 of master coupler 36 as seen in FIG. 3 is coupled to the $R_3$ terminal of unit 228 as a high level signal and connected from three to coupler bus 38 as a high level MER(OUT) signal. Continuing with reference to FIG. 3 this signal is received by slave coupler 34 as a high level MER(IN) signal which is gated through AND gate 226 when the TMB signal of slave coupler 34 goes high. This high level output from AND gate 226 is coupled through unit 288 and draws the TLMER- line of communication bus 22 low thereby indicating to master device 14 that a read error has occurred in slave device 28.

The communication bus signal TLPRES- is a normally high signal that goes low at least ten microseconds before any DC power voltage begins to fail due to normal shutdown or to AC power failure. TLPRES- is generated by the power supply. The signal maintains a path to ground of less than one ohm during and after power failure. During AC power turn on, TLPRES- will remain at ground until after all DC power voltages are stable. As seen in FIG. 2, a low level TLPRES- signal results in a low level signal on line 168 to clear flip flops 80, 82 and 84. The consequent low Q output of flip flop 84 also clears flip flop 86. Turning to FIG. 3 the low level TLPRES- signal results in a high level START(OUT)- signal. Thus, it will be seen that when TLPRES- goes low, the affected coupler terminates all attempts to gain access to its communication bus or to communicate with the associated coupler through its coupler bus.

The structure of the coupler also serves to minimize the effects of other types of failures. If, for example, a coupler should be inadvertently disconnected from its associated coupler bus, this would leave the START(IN)- input floating, both in the disconnected coupler and in the associated coupler at the other end of the coupler bus. Since in both cases, however, the START(IN)- input is connected through resistor 72 to the positive voltage supply $V_{cc}$ within the coupler itself, both couplers are inhibited from erroneously seeking access to their respective communication buses.

In FIG. 3, the TLWAIT- signal is a normally high signal on the communication bus which can be drawn low by a coupler when it requires access to the communication bus in preference to all other master devices on the bus. If the WAITB signal in FIG. 3 for example is high, this will cause the TLWAIT- signal on the communication bus to be low. To illustrate the effect of a low TLWAIT- signal on master devices, let it be assumed that some other coupler which is tied to the same communication bus has pulled the TLWAIT- signal low. Then, the $R_2$ terminal of the coupler illustrated in FIG. 3 will be high. Since the WAITB- signal is normally high, the output of NAND gate 240, that is, the WAITA- signal is low. Turning to FIG. 5a, it is seen that the low level WAITA- prevents an ACCESS signal from causing the output of NOR gate 308 to go low.

Accordingly, the enable input of the communication bus drivers 290, 292 and 294 cannot connect the address on the driver terminals to the communication bus. The ADREN signal remains low. With the ADREN signal low, it is not possible for the coupler to drive the TLGO- signal low on the communication bus. Accordingly, it is seen that the presence of a low level TLWAIT- signal on a communication bus presents master devices or couplers from taking control of the bus.

Figure 7:
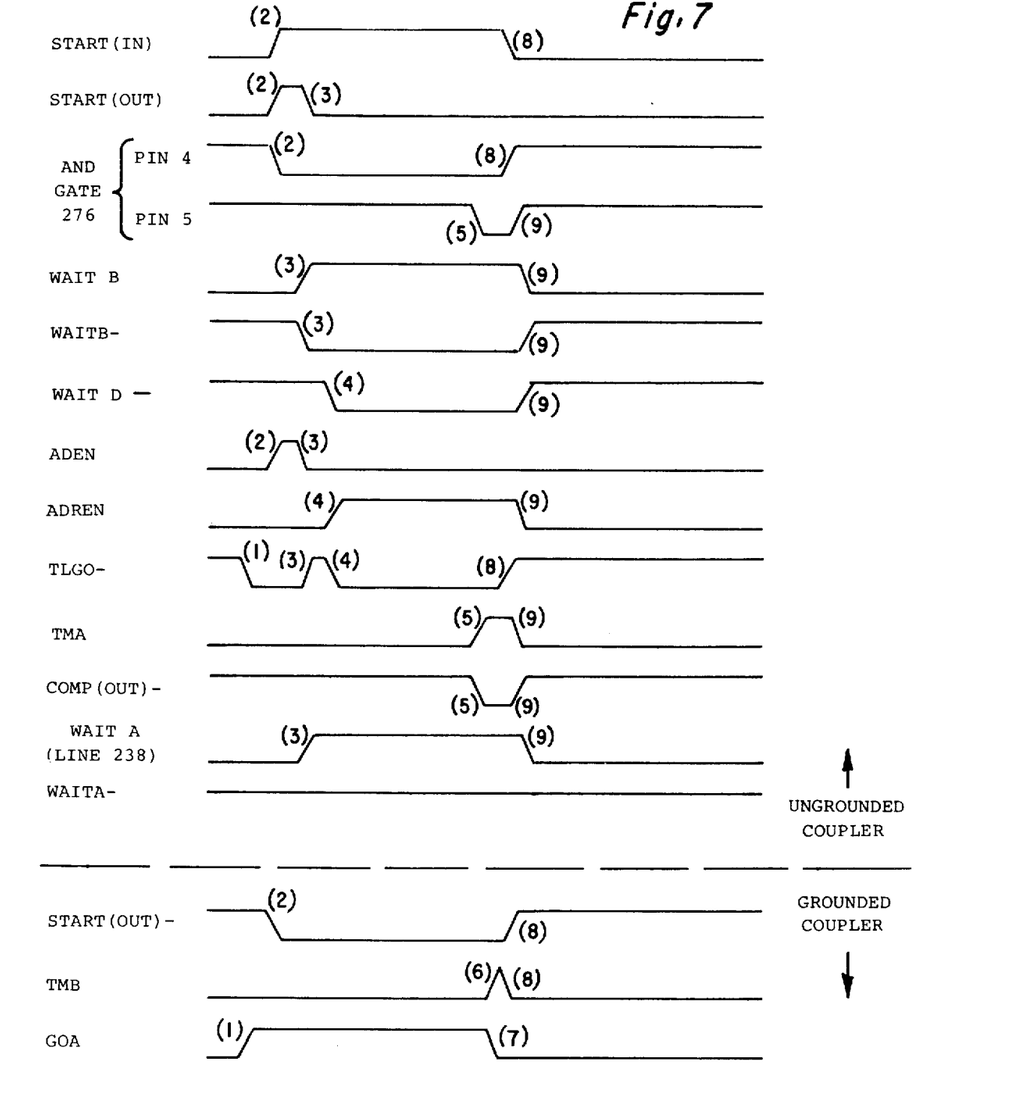
FIG. 7 is a timing diagram for the impass resolution logic.

The waveform timing diagram of FIG. 7 may be helpful in understanding the operation of the impass resolving circuit illustrated in FIG. 4. The type of impass with which this circuit deals arises when master devices on two coupled communication buses seek to communicate with a slave device on the opposite communication bus. Neither master can communicate through the opposite communication bus, however, since the other master will have control of the opposite communication bus. The circuit of FIG. 4 serves to resolve this difficulty. The nature of the resolution is predetermined since in one of the couplers connected to the coupler bus the INHWAIT terminal of FIG. 4 is left floating while in the other coupler attached to the coupler bus the INHWAIT terminal is grounded. Thus, the coupler with the grounded terminal will have a low level INHWAIT signal while the opposite coupler will have a high level INHWAIT signal. In the waveform diagram of FIG. 7 those waveforms above the dashed line pertain to the ungrounded coupler while those waveforms below the dashed line pertain to the grounded coupler.

It will be assumed that at time (1) the TLGO- signal on the communication bus connected to the grounded coupleer goes low, thereby resulting in a high level GOA signal in the grounded coupler. After a short dely this causes the START(OUT)- signal of the grounded coupler to go low at time (2). This causes the START(IN) signal at the ungrounded coupler to go high. Let it also be assumed that at time (1) the TLGO- signal on the communication bus coupled to the ungrounded coupler goes low. Again, after a short delay this results in the START(OUT) signal of the ungrounded coupler going high at approximately time (2). Since at this point the WAITB- signal is in its normally high state, it will be seen from FIG. 5a that the high level START(OUT) signal will cause the ADEN signal of the ungrounded coupler to switch to the high state. Again, with reference to FIG. 4, the high level START(IN) signal, after inversion by inverter 274, causes input terminal 4 of AND gate 276 to go low. The high output of AND gate 250 resulting from the high level START(IN) and START(OUT) signals is connected directly to one input of NAND gate 258. After a short time delay introduced by RC network 256, the other input of NAND gate 258 also goes high. The resulting transition of the output of NAND gate 258 to the low state causes the clock input of flip flop 262 to undergo a positive going transition. Such transition does not occur in the grounded coupler since the INHWAIT signal is always low and the clock terminal of flip flop 262 is always high in that coupler.

Again, with reference to the ungrounded coupler, the positive going clock pulse causes the Q output of flip flop 262, that is the WAITB signal, to go high at time (3). Simultaneously, the WAITB- signal switches to the low state. After a short time delay introduced by RC network 266 the WAITD- signal also switches to the low state at time (4). Again referring temporarily to FIGS. 5a, the low level WAITB- signal results in the ADEN signal returning to the low state. In FIG. 3 the high level WAITB signal is coupled through unit 228, thereby causing a low level TLWAIT- signal on the communication bus coupled to the ungrounded coupler. The high level WAITB signal also causes the $R_2$ terminal of unit 228 to be in the high state. This high level signal appearing on line 238 is referred to in FIG. 7 as the WAITA signal. In this case, however, since the ungrounded coupler is the initiator of the low level TLWAIT- signal, the low level WAITB- signal enables the WAITA- signal to remain high.

It will be recalled that the low state of the TLGO- signal on the communication bus connected to the ungrounded coupler was caused by a master device on that bus. However, at time (3) the low level TLWAIT- signal on that bus causes the master device to release the TLGO- signal to the high state. As a result, the GOA signal in the ungrounded coupler goes low and the START(OUT) signal in the ungrounded coupler also goes low.

Again, with reference to FIG. 5a, the negative going transition of the WAITD- signal at time (4) causes the ADREN signal to go high. Then in FIG. 2, since the START(IN) signal is in the high state, this high level ADREN signal causes the TLGO- signal on the communication bus connected to the ungrounded coupler to go low. It should be noted, however, that at this point the TLGO- signal is under control of the ungrounded coupler whereas originally it had been under control of a master device on the communication bus. This low level TLGO- signal will cause some slave device on the communication bus connected to the ungrounded coupler to initiate a data transfer. After the data transfer is complete the slave device causes the TLTM- line of the communication bus to go low. This results in a high level TMA signal in the ungrounded coupler at time (5). This causes the pin 5 input of AND gate 276 to go low. The high level TMA signal operating through NAND gate 152 of FIG. 2 also causes a high to low transition in the COMP(OUT)- signal.

Accordingly, the COMP(IN)- signal in the grounded coupler goes low at time (5) and after a short delay introduced by RC network 214 this causes a positive going transition at the clock input of flip flop 220. This causes the TMB signal of the grounded coupler to go high at time (6). This high level TMB signal is coupled through unit 70 of FIG. 2 to cause a low level TLTM- signal on the communication bus associated with the grounded coupler. This tells the master device controlling that communication bus that the grounded coupler has completed its data transfer. Accordingly, that master device will release the TLGO- signal to the high state thereby causing the GOA signal of the grounded coupler to go low. This low level GOA signal in FIG. 3 clears each of flip flops 196, 222 and 220, thereby causing the START(OUT)- signal to go high and the TMB signal to go low, both at time (8). Simultaneously, the START(IN) signal of the ungrounded coupler goes low. This causes the signal at pin 4 of AND gate 276 to switch to the high state. Also the low level START(IN) signal operating through NAND gate 154 of FIG. 2 causes the TLGO- signal to go high on the communication bus attached to the ungrounded coupler. As a result the slave device on this communication bus releases the TLTM- signal to the high state, thereby causing the TMA signal of the ungrounded coupler to switch low at time (9). The low level TMA signal through NAND gate 152 of FIG. 2 releases the COMP(OUT)- signal to the high state in preparation for the next cycle of operation. At the same time the low level TMA signal operating through NAND gate 278 of FIG. 4 causes the pin 5 input of AND gate 276 to go high. It is seen that at time (9) both inputs to AND gate 276 are high so that at this time its output goes high. At this point in time the WAITB signal of FIG. 4 is still high so that the output of NAND gate 270 switches low. This causes the output of AND gate 272 to switch low and flip flop 262 is cleared the WAITB signal goes low while the WAITB- and WAITD- signals both go high. With the WAITB signal in the low state the WAITA signal appearing on line 238 is allowed to return to the low state. With reference to FIG. 2, the negative going transition of the TMA signal at time (9) causes the clock input of flip flop 86 to switch high at this time. This causes the Q output of flip flop 86 to switch low, thereby clearing access flip flop 84. Finally, with reference to FIG. 5a, since the WAITD- signal is now high and the access signal is low, the ADREN signal switches low. At this point in time the couplers are in the idle state awaiting the next access by a master device.

In the embodiment shown in FIG. 2, RC network 112 includes a resistor of 330 ohms and capacitor of 750 picrofarads.

RC network 138 includes a resistor of 51 ohms and capacitor of 470 picofarads.

RC network 146 includes a resistor of 3,000 ohms and a capacitor of 0.0047 microfarads.

In FIG. 3, RC network 186 includes a resistor of 330 ohms and a capacitor of 390 picofarads.

RC network 214 includes a resistor of 330 ohms and a capacitor of 220 picofarads.

In FIG. 4, RC network 256 includes a resistor of 330 ohms and a capacitor of 680 picofarads.

RC network 266 includes a resistor of 330 ohms and a capacitor of 750 picofarads.

While the invention has been disclosed in terms of a system wherein the data were all expressed in words of 16 bit lengths and address words were of 20 bit lengths, it will readily be appreciated that the bit complement of the communication bus can be expanded or contracted in order to accommodate operations and systems having different formats. Thus, the present example has been given as representative of such other systems. Moreover, the couplers have been disclosed as containing a single block of acceptable addresses this block being defined by the upper and lower bound limit structures of FIGS. 5a and 5b. The provision of multiple upper and lower bound structures within a single coupler so as to provide a plurality of acceptable address blocks is also within the contemplation of the invention.

Having described the invention in connection with certain specific embodiments thereof, it is to be understood that further modifications may now suggest themselves to those skilled in the art and it is intended to cover such modifications as fall within the scope of the appended claims.

What is claimed is

1. A data processing system comprising at least two communication buses, at least one master device and one slave device connected to each of the buses, each of the master devices including means for providing a go signal and an address, each of the communication buses being the communication link between master devices and slave devices connected to the bus, the system having a coupler structure for providing a communication link between two communication buses, the coupler structure comprising:

(a) a first and second coupler connected to the first and second of the communication buses, respectively, the first and second couplers being connected by a coupler bus having means for carrying control and address signals:

(b) each of the couplers further comprising:
  (1) means responsive to a go signal and an address, both generated by a master device connected to the bus to which the coupler is connected to transmit a start signal and an address to the other of the couplers, and
  (2) means responsive to a start signal and address transmitted by the other of the couplers to transmit control signals and an address to the communication bus to which the coupler is connected;

(c) at least one of the couplers further comprising:
  (1) means for detecting the simultaneous occurrence of a start signal transmitted by itself and a start signal transmitted by the other of the couplers, and
  (2) means responsive to said means for detecting to transmit a wait signal on the communication bus to which the coupler is connected to cause the master device which transmitted the go signal on that bus to relinquish control of the bus.

2. The system of claim 1 further comprising logic circuits in said master devices for seeking and acquiring access to the communication bus and, in each of said couplers, a like logic circuit responsive to a start signal transmitted by the other coupler to seek access to the communication bus to which it is connected.

3. The system of claim 2 further comprising a control line for connecting the master devices and the couplers on each communication bus in series in a preselected order of priority, and means in each of said logic circuits to transmit a preselected logic level on said control line to all lower priority master devices and couplers when any master device or coupler is seeking access to the communication bus.

4. A data processing system comprising two buses for providing communication between master and slave devices, each of said buses having at least one master device and one slave device connected to it, each of said master devices including a first logic circuit for acquiring access to its bus and for placing a go and an address signal on the bus when access is acquired, each of said slave devices including a second logic circuit selectively responsive to a go and an address signal on the bus to transfer data via the bus with the master device which transmitted the go signal, and a coupler structure for providing a data transfer path between said buses, said coupler structure comprising:

(a) a pair of slave circuits each connected to one of the buses, (b) a pair of master circuits each connected to one of the buses, (c) each slave circuit having means responsive to a go and an address signal on the bus to which it is connected to send a start signal to the master circuit connected to the opposite bus to cause the master circuit to seek access to said opposite bus, (d) a detector for providing a logic signal when start signals are simultaneously present from both of said slavve circuits, and (e) means responsive to said logic signal to cause the master device having access to a predetermined one of said two buses to relinquish access to the bus.

5. The system of claim 4 wherein each of said master circuits further comprises a bus access section operative in the manner of said first logic circuit.

* * * * *